Nov. 12, 1929.　　　R. W. LINDSAY　　　1,735,326
FLEXIBLE HOSE COUPLING
Filed Feb. 4, 1927

INVENTOR
ROY W. LINDSAY
BY
Clarence S. Ashley
ATTORNEY

Patented Nov. 12, 1929

1,735,326

UNITED STATES PATENT OFFICE

ROY W. LINDSAY, OF HUNTINGTON, NEW YORK, ASSIGNOR OF ONE-HALF TO RAYMOND BURR JONES, OF BRONXVILLE, NEW YORK

FLEXIBLE HOSE COUPLING

Application filed February 4, 1927. Serial No. 165,775.

The invention relates to improvements in rigid and flexible pipe and conduit couplings and has particular and specific reference to means for hermetically sealing rigid and flexible pipe ends or taps into adjacent structures such as cylinders, chambers, vacuum casings and other similar members.

The object of the invention resides in the providing of a supporting coupling member provided with an ensealing seat arranged to receive the end of a pipe connection carrying a soft or semi-pliable metallic sleeve engaging said ensealing seat, together with a stuffing box member or jam-nut detachably mounted in said coupling member and in contact with said semi-tractable sleeve adapted to draw the same into contact with said seat to cause a slight distortion in the body of said sleeve at its point of contact to form a hermetically ensealing means for divers forms of pipe and forms of conduit means.

Another object of the invention consists of applying semi-tractable sleeves to both rigid and flexible tubing or piping for use in connection with all known forms of couplings to insure leak-proof connective means for structures employing liquid or air carrying conduits.

In the following there is described a general embodiment of the invention, the particular and broad features thereof being pointed out hereinafter in the claim.

Figure 1:
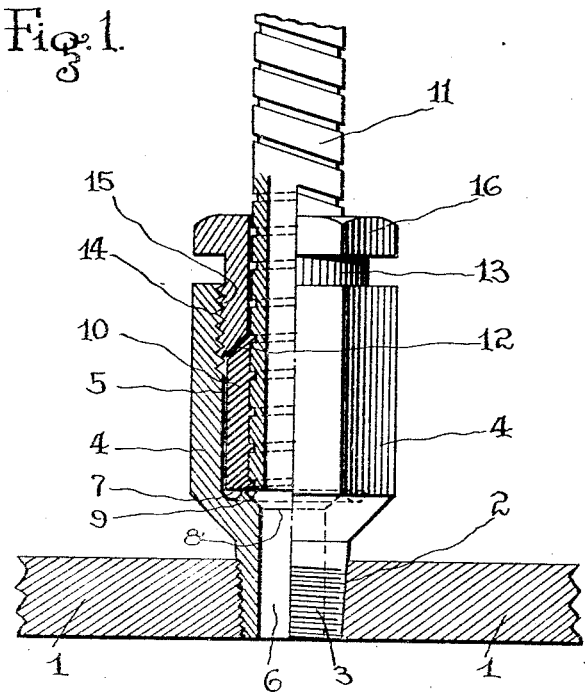
Figure 2:
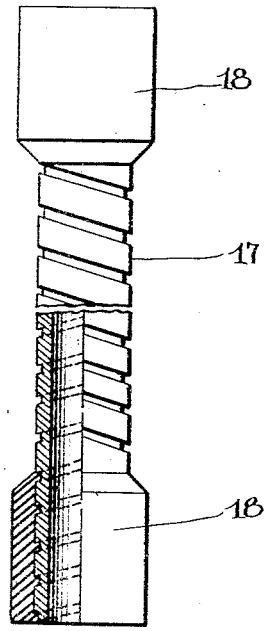

In the drawings Fig. 1 is an elevation partly in longitudinal section of the coupling as applied to a form of resilient pipe or conduit and showing the same as connected directly with an adjoining body such as a chamber or the like; and Fig. 2 is an elevation partly in section of a flexible pipe section having attached to its respective ends thereof a pair of semi-tractable metallic sleeves for use in connection with varied form of conduit couplings.

Similar numerals of reference indicate similar parts throughout the several views.

In the drawings 1 designates the wall section of a chamber or other enclosed structure of a like nature and is provided with a threaded aperture 2 arranged to receive the threaded nipple end 3 of supporting coupling member 4. Said member 4 may be made in any suitable form and size and of any metal and has formed therein a chamber 5 communicating with a passage-way or bore 6 and has formed at the intersection of said chamber 4 and bore 6 a seat 7. Seat 7 is formed by milling an annular rim 8 into a sharp ridge 9 of a lesser diameter than chamber 5 of a greater diameter than bore 6, and the peripheral surface of ridge 9 receives the end of semi-tractable metallic sleeve 10 rigidly attached to pipe connection 11, the outer end thereof being tapered at 12 to receive jam-nut or stuffing head 13, the latter element thereof being externally threaded at 14 to engage the threaded bore 15 of chamber 5 and having formed therewith a hexagonal head 16 for locking purposes.

By reason of the fact that seat 7 is of hardened metallic body, and sleeve 10 of a semi-pliant or tractable metal the forced pressure of jam-nut 13, the end of said sleeve 10 distorts to a slight extent and forms at the juncture point of the engaging members thereof a positive hermetic ensealing means.

In Fig. 2 of the drawings the structure therein shows a flexible pipe connection 17 having fastened on its respective end attaching semi-pliant metallic sleeves 18 for combined use in connection with the herein described type of pipe coupling or in fact for use in combination with any other form of coupling.

It is obvious that the structure may be altered in many ways without departing from the general scope of the invention.

What is claimed and desired to secure by Letters Patent of the United States is:

A device of the character described including a coupling head for metallic pipe or duct ends comprising a recessed body internally threaded in a portion of its area and chambered in the remaining portion, and having formed at the bottom thereof a rimmed seat, a hose end connection mounted in said recessed body, a tractable metallic sleeve of a lesser diameter than the diameter of said chambered recess mounted in said chamber and engaging said seat and the surface of said hose end, and a pack-nut mounted in the threaded portion of said recess adapted to engage said tractable sleeve and when tightened to the limit of its movement in said body partly distort said sleeve to seal the same on said seat and around all of the surface of said hose end within said body, and by reason of the difference in the diameters of said recessed chamber and sleeve provide means for forming new seats during the adjustment of the relative parts thereof.

In testimony whereof I have signed my name to this specification this 24th day of January, 1927.

ROY W. LINDSAY.